United States Patent
Kampe et al.

[11] Patent Number: 6,016,107
[45] Date of Patent: Jan. 18, 2000

[54] RELIABLY UPDATING AN INFORMATION SERVICE MESSAGE

[75] Inventors: Frederick Loring Kampe, Boynton Beach, Fla.; Scott Christopher Smith, St. Louis, Mo.; Jheroen Pieter Dorenbosch, Paradise, Tex.; Robert Nathan Nelms, Boynton Beach, Fla.

[73] Assignee: Motorola, Inc., Schaumburg, Ill.

[21] Appl. No.: 08/886,102

[22] Filed: Jun. 30, 1997

Related U.S. Application Data

[60] Provisional application No. 60/038,715, Mar. 7, 1997.

[51] Int. Cl.[7] ....................................... G08B 5/22
[52] U.S. Cl. ..................... 340/825.44; 455/38.1; 455/38.2; 340/825.27
[58] Field of Search ............. 340/825.44, 825.22, 340/825.26, 825.27, 825.54; 455/38.1, 38.2

[56] References Cited

U.S. PATENT DOCUMENTS

| | | | |
|---|---|---|---|
| 5,025,252 | 6/1991 | DeLuca et al. | 340/825.44 |
| 5,045,848 | 9/1991 | Fascenda | 340/825.26 |
| 5,173,688 | 12/1992 | DeLuca et al. | 340/825.44 |
| 5,185,604 | 2/1993 | Nepple et al. | 340/825.44 |
| 5,241,305 | 8/1993 | Fascenda et al. | 340/825.44 |
| 5,283,832 | 2/1994 | Lockhart et al. | 380/49 |
| 5,345,227 | 9/1994 | Fascenda et al. | 340/825.22 |
| 5,426,422 | 6/1995 | Vanden Heuvel et al. | 340/825.27 |
| 5,426,424 | 6/1995 | Vanden Heuvel et al. | 340/825.44 |
| 5,546,077 | 8/1996 | Lipp et al. | 340/825.44 |
| 5,555,183 | 9/1996 | Willard et al. | 340/825.21 |

*Primary Examiner*—Michael Horabik
*Assistant Examiner*—Anthony A. Asongwed

[57] ABSTRACT

A selective call device (130) has a receiver (204) for receiving a selective call signal including an address (312). An address correlator (214) coupled to a decoder (212) determines that the selective call signal is directed thereto and determines whether the selective call signal includes an update command (400, 500). The update command includes a major version number (406, 506), topic numbers associated with sub-message(s) stored in the selective call device, update data associated with each topic number for updating the sub-messages, and minor version numbers (427, 527) associated with each topic number. The major version number is incremented when a sub-message template is changed. Minor version numbers are incremented after each update. The selective call device updates a sub-message with update data only if the update command includes a current major version number and an incremented minor version number.

9 Claims, 11 Drawing Sheets

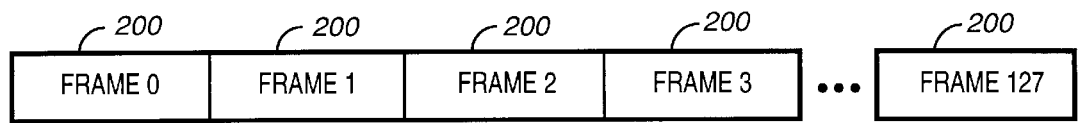
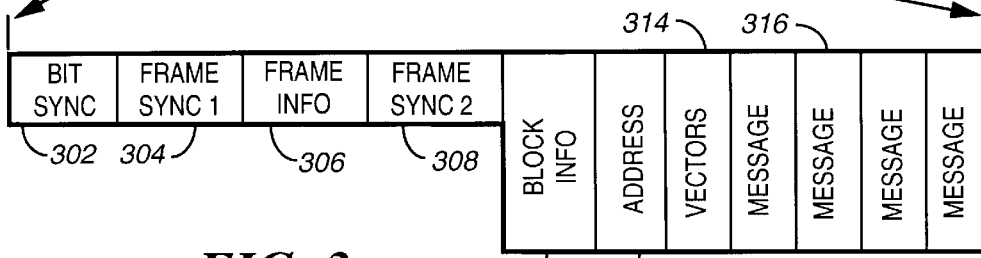
*FIG. 2*
*FIG. 3*
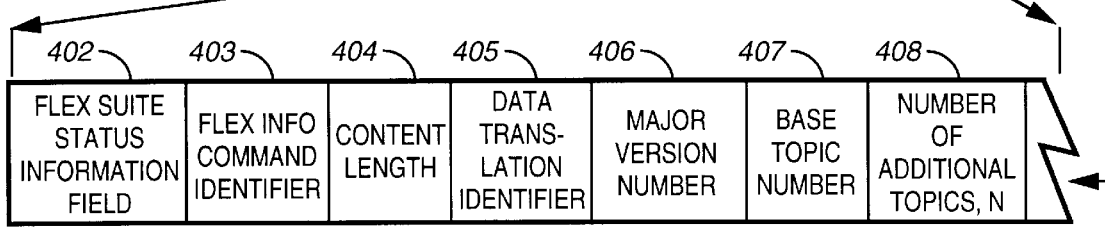
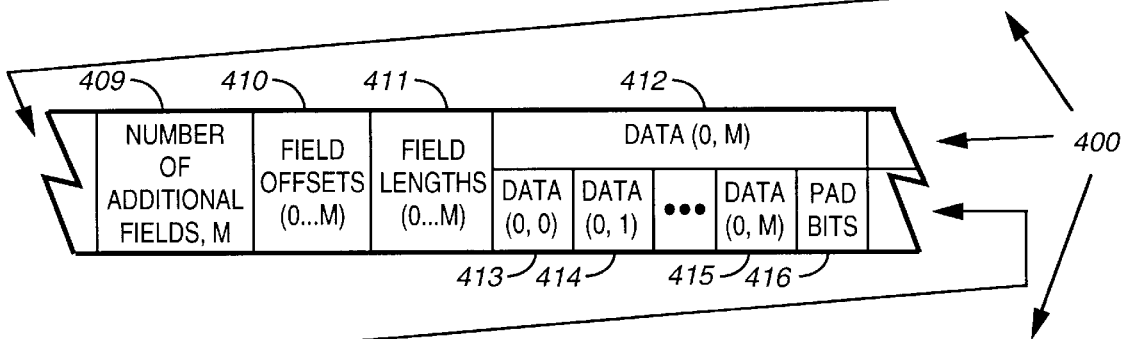
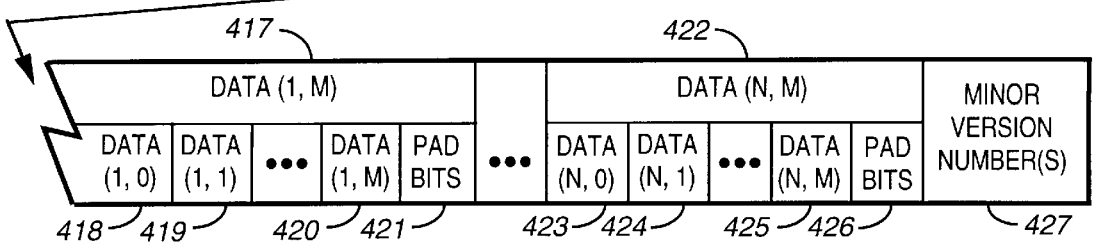
*FIG. 4*

Update #1: Change Current Price to "47.250" (only decimal portion is changed)

Update #2: Change Current Price to "47.500" (only decimal portion is changed)

Update #3: Change Current Price to "47.875" (only decimal portion is changed)

RELIABLY UPDATING AN INFORMATION SERVICE MESSAGE

RELATED APPLICATIONS

This application is related to, and applicants hereby claim the benefit of the prior filing date of, co-pending provisional application No. 60/038,715, entitled "EFFICIENTLY UPDATING AN INFORMATION SERVICE MESSAGE AFTER A CHANGE IN THE INFORMATION SERVICE MESSAGE STRUCTURE" filed Mar. 7, 1997, by the identical inventors as the inventors of the present application.

FIELD OF THE INVENTION

This invention relates in general to communication systems transmitting information service messages to selective call devices, and more specifically to a method for updating sub-messages embedded within a message of a selective call wireless communication protocol.

BACKGROUND OF THE INVENTION

A conventional selective call device, e.g., a selective call receiver or a transmitter and a selective call receiver, often can receive messages from more than one source. Sources are distinguished from each other typically by an address information associated with each message. When the address information correlates, or matches, a predetermined address in the selective call device, the selective call device receives and stores the message from a particular information source.

Modern selective call service providers are capable of sending multiple types of data including information services, for example, news, stock market data, weather forecasts, and sport scores, periodically to a subscribing selective call device. However, there is usually a need to transmit updates to previously transmitted information services data.

In general, an information service message is more lengthy than a personal message. However, in many instances, information service messages are repetitive of a prior information service message but for a relatively small portion of changed or new data. Information service messages include both headers and numerical data together and often only the numerical data changes from one information service message to the next. For example, when transmitting stock price information, the stock name, year high and year low information will change much less frequently than the stock's current trading price. As other examples, both sports scores and weather information service messages comprise, in one part, information that is updated on an infrequent basis such as team names or geographic data. Correspondingly, another part of such information service messages comprises information that is frequently updated such as team scores and atmospheric conditions.

In order to reduce airtime, known methods and systems of updating information services messages transmit only a predetermined portion of an information service message. The predetermined portion is that portion which frequently changes. A remaining portion, or template, is that portion which seldom changes. However, after a passage of time, typically after one day, there occurs a need to make a change within the template or to change the size of the template. This is usually accomplished through the use of a new template message For example, if the information service subscribed to is sports scores, the name of the teams will usually change once per day, but the scores will usually change many times per day. It is possible that a selective call device is out-of-range and does not receive the new template message transmitted for the purpose of changing the name of a sports team. Disadvantageously, with known systems and methods, updates, such as a current score of a game, sent to a selective call device that had failed to receive the new template message will continue to be received by the selective call device and be displayed next to the wrong team name.

It is well known to transmit one or more information services sub-messages embedded within a message of a conventional selective call protocol. It is also well known that paging systems do not always transmit messages in the order that the messages were submitted to the paging system; therefore, an embedded information services sub-message will occasionally be received by a selective call device out of sequence. It is usually not of critical importance that conventional personal paging messages be received by a selective call device in the exact order that they were submitted to the paging system because personal messages are typically submitted by different persons or have no special relationship to other personal messages. However, with many information services messages, such as stock prices, the sequence of receiving information services sub-messages is very important because the exact sequence itself conveys important and useful information, such as whether a stock is continually rising in price. With known systems and methods, if an older information services update message is transmitted subsequent to a newer information services update message, the older update will be received and incorrectly displayed by a selective call device as a more recent update.

Thus, what is needed are a method of reliably sending updates to multiple information services sub-messages, or topics, after a change has been made in the template, and a method of recognizing updates received out-of-sequence.

BRIEF DESCRIPTION OF THE DRAWINGS

FIGS. 2–5 are timing diagrams illustrating the transmission format of the signaling protocol utilized by the selective call system of FIG. 1 in accordance with the preferred embodiment of the present invention.

DESCRIPTION OF A PREFERRED EMBODIMENT

Figure 1:
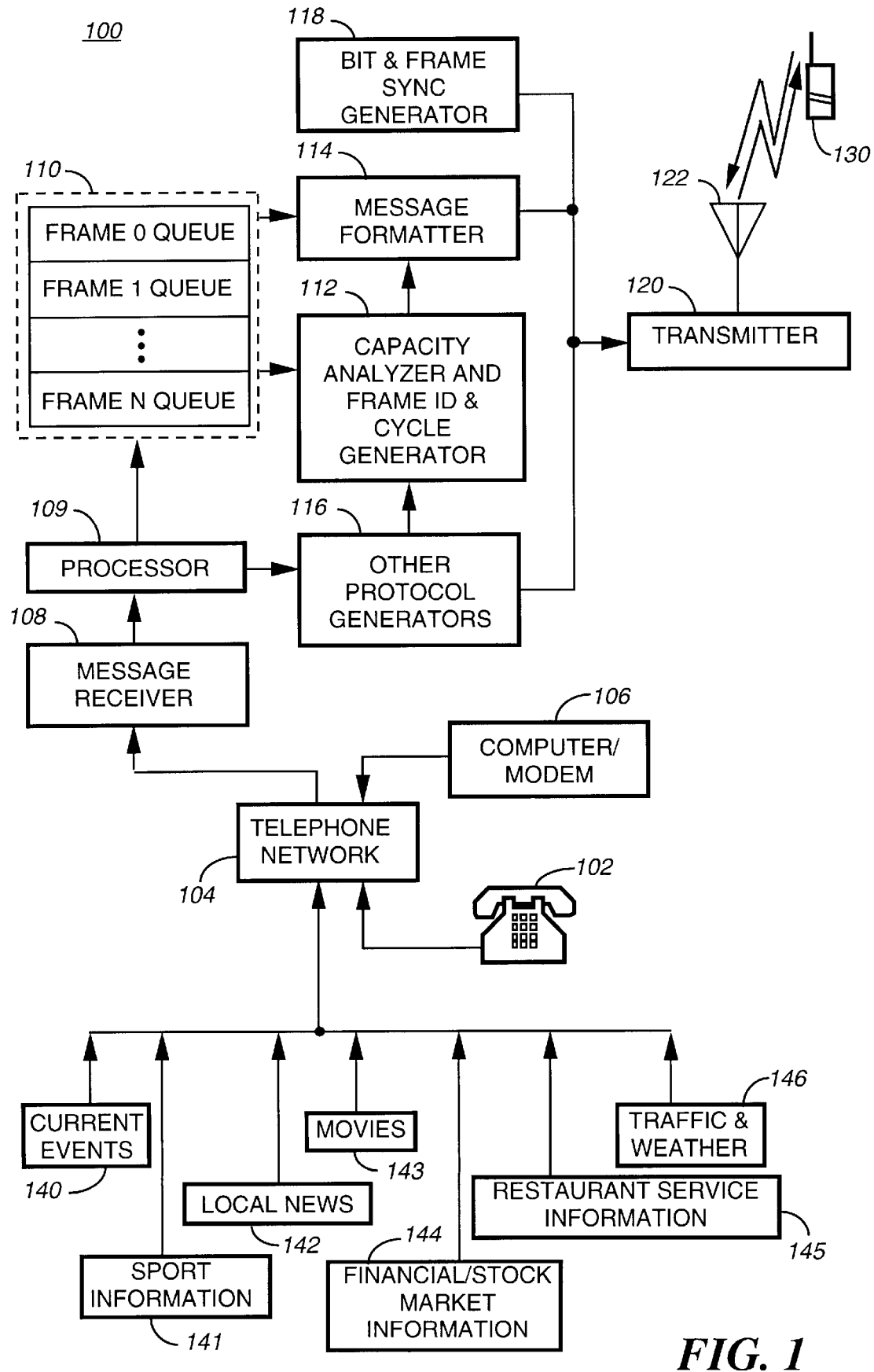
FIG. 1 is an electrical block diagram of a selective call system for providing information services in accordance with a preferred embodiment of the present invention.

FIG. 1 shows an electrical block diagram of a paging system, or selective call system 100, for generating and transmitting (or broadcasting) a selective call signal (or communication signal) including a plurality of information services in accordance with a preferred embodiment of the present invention. The functions of the selective call system 100 are preferably implemented within software, for example within a MODAX 500 Selective Call Terminal that is manufactured by Motorola Inc., of Schaumburg, Ill. Typically, a subscriber can send a message by using a telephone 102 to initiate a transmission of a selective call message. As is well known, the telephone 102 couples to the selective call system 100 via a telephone network 104, the operation of which is well known to one of ordinary skill in the art. Similarly, a computer/modem 106 is also coupled to the telephone network 104 to enter information, for example alphanumeric or numeric messages. The telephone network 104 couples to a message receiver 108 which receives the messages to be transmitted (broadcast) to at least one of a plurality of selective call devices 130, typically from the public switched telephone network 104.

According to the preferred embodiment, a plurality of information services 140–146 are coupled to the telephone network 104 which is coupled to a processor 109 via the message receiver 108. Alternatively, the plurality of information services 140–146 can be received via radio frequency signals. At frequent intervals, the providers of the information services send to the selective call system 100 updates of previously sent information services messages.

When the processor 109 receives updates, the information is encoded as a message in the form of a selective call signal (or communication signal). Specifically, the processor 109, coupled to the message receiver 108, determines an appropriate protocol, preferably the FLEX™ protocol, and an address to encode the information service. If the processor 109 determines that the message is to be sent via another signal format, it is passed to one of another protocol generator 116. When the processor has determined that the information services messages are to be transmitted on the FLEX protocol, the messages are then encoded and stored in a frame queue buffer 110 which has queues (FRAME 0-N QUEUES) for the corresponding frames of the signal. Preferably the number of frames N is 128. The predetermined frame identification (ID) of the selective call device 130 corresponding to the message is determined and the message is stored in the corresponding frame queue. A capacity analyzer and frame ID/cycle generator 112 determine the sequence of frame IDs to be transmitted and analyze the capacity of each frame to determine the cycle value to be used. The capacity analyzer and frame ID/cycle generator 112 is also responsive to other protocols being transmitted For example, if the expected occurrence of a frame is to be replaced by the transmission of one of the other protocols (thereby diminishing the capacity of the frame), the capacity analyzer and frame ID/cycle generator 112 can account for this with the determined cycle value. A bit and frame sync generator 118 synchronously generates bit and frame synchronization signals. A message formatter 114 determines, in response to the address of selective call devices 130 and the frame queue, a frame in which the message is to be included. The messages are then formatted for transmission. A transmitter 120 accepts signals from message formatter 114, from other protocol generator 116 and from bit and frame sync generator 118, and transmits radio frequency selective call signals to selective call devices 130 via antenna 122 in a manner well known to those of ordinary skill in the art.

FIG. 2 shows a standard protocol format, the FLEX protocol, encoded into one-hundred-twenty-eight (128) message packets or frames 200. Each of the frames 200 is preferably 1.875 seconds in duration and has a preferred base data rate of 6400 bits per second.

Referring to FIG. 3, each frame is comprised of a bit sync signal 302, preferably 32 bits of alternating 1, 0 patterns, followed by a FRAME SYNC#1 signal 304 preferably having a predetermined thirty-two bit word and its thirty-two bit inverse, and a FRAME INFO word signal 306, preferably one thirty-two bit word having twenty-one variable information bits containing information such as a cycle number and a frame number. The BIT SYNC signal 302 provides bit synchronization to the selective call device(s) 130 while the FRAME SYNC#1 signal 304 provides frame synchronization and includes a signal indicative of the data rate of the message information Following the FRAME INFO word signal 306 is a FRAME SYNC#2 308. Following the FRAME SYNC#2 308 is a block info word signal 310 including information such as the number of priority addresses, end of block information field, and vector start field. The code word of each frames 200 is preferably encoded as 31, 21 Bose-Chaudhuri-Hocquenghem (BCH) code words having twenty-one information bits and ten parity bits generated according to the well-known BCH algorithm. An additional even parity bit extends the word to a 32, 21 code word. The addresses are located in block 312, the vectors pointing to the messages are located in block 314, and the messages are located in the remaining blocks, such as block 316. Generally, all the address signals within the frame are located in a first portion, or address portion, of the frame, such as in block 312, and all the message signals are located in a subsequent portion, or message portion, of the frame, such as in block 316. It is well known to those skilled in the art how to locate addresses in a first portion and messages in a second portion of the frame 200. Words 310, 312, 314 and 316 are shown in a vertical orientation to indicate that these words may be interleaved in order to improve the immunity of the transmission to burst errors. All binary, and selected alphanumeric, outbound messages in one-way selective call systems, and all binary, and selected alphanumeric, forward channel messages in two-way selected call systems comprise a protocol-defining header, or Status Information Field, followed by a data field. The FLEX protocol is more fully explained in U.S. Pat. No. 5,555,183, entitled Method and Apparatus For Synchronizing To A Synchronous Selective Call Signal, issued Sep. 10, 1996, to Willard, et al., which is assigned to the assignee of the present invention, and which is hereby fully incorporated by reference herein.

As is well known in the prior art, a selective call device is pre-programmed with one or more transport-level communication protocol addresses for receiving messages. For example a selective call device 130 is pre-programmed with one FLEX address for receiving personal messages and with a plurality of additional, unique FLEX addresses for receiving each of the plurality of information services 140–146 to which the selective call device subscribes. It is also well known that each message received by the FLEX address corresponding to any one of the information services 140–146 is formatted similarly, if not identically. Subscribers to an information service 140–146 receive original messages, and thereafter receive updates to the original messages. Typically, only a relatively small portion of the information within each original message changes with time; therefore, only the relatively small portion need be updated, i.e., transmitted as an update message. For example, a person who subscribes to Financial/Stock Market Information 144 service usually pre-designates the stocks for which the person wishes to receive prices Each of the stocks associated with the Financial/Stock Market Information 144 service is pre-assigned a sub-address, or Topic Number. The sub-address, or Topic Number, is separate from the FLEX address. Typically, a sub-message associated with each stock contains several types of information, in separate fields, for presentation on the display, such as: a stock symbol, current price, an indication of a change in the prices and the direction of the change, if any, the volume, the high and low price for the day and/or for the year, an ex-dividend date indication, etc. The fact that each field within of each Financial/Stock Market Information 144 service message is located in a substantially similar location, means that it is possible to update the current price and volume of a plurality of stocks in one update message by compactly transmitting, within an update command, the Topic Numbers of stocks that are to be updated and location information of each field to be updated, as described more fully in U.S. patent application entitled Performing Updates To Multiple Information Service Topics Using A Single Command, having attorney Docket No. PT02541U, mailed May 31, 1997, claiming benefit of U.S. provisional patent application Ser. No. 60/040,622 filed Mar. 7, 1997 assigned to the assignee of the present invention and which is hereby fully incorporated by reference herein. Other information services messages, such as sport scores and weather, having different FLEX addresses, are updated in a similar fashion. Generally, there is a single FLEX address for each group of Topic Numbers sharing a similarly formatted sub-message.

Referring to FIG. 4, one of the messages, message 316, is illustrated in more detail in accordance with the preferred embodiment of the present invention. Updates to the information services 140–146 are encoded in one of the messages, such as message 316, for transmission to the selective call devices 130. There are various methods and levels of communication passed to selective call devices 130 from a selective call system 100, and a procedure is needed to identify which application-layer, or embedded, protocol was used by an information service 140–146 to encode the information content contained in such transfers. A Status Information Field 402 identifies that an embedded protocol message 401, preferably a FLEXsuite™ embedded protocol message, as opposed to a regular selective call message, is being transmitted. The term "embedded protocol" means an application-layer communication protocol carried by a transport-layer communication protocol. FLEXsuite comprises several embedded protocols used to transfer applications, i.e., computer programs, and data for use by such applications, over a selective call system 100 that uses the FLEX protocol. When a transmission channel has limited capacity, it is advantageous to use a radio frequency-based embedded protocol, such as one of the FLEXsuite protocols, rather than one of the more feature-rich, wireline based, prior art protocols. The Status Information Field 402 defines which method among several possible methods of transferring information to a selective call device from the selective call system 100 is used. The Status Information Field is defined as the first eight bits of application-layer information in a FLEXsuite embedded protocol message 401. It should be understood that a message 316 can comprise one or more FLEXsuite embedded protocol messages 401, or sub-messages, in which case, each of the one or more embedded protocol messages has a separate Status Information Field 402. It should also be understood that a message 316 can comprise one or more FLEXsuite embedded protocol messages 401 and one or more regular selective call messages. The purpose of the Status Information Field 402 is to provide to the controller 210 (FIG. 6) the information needed by the software of the selective call device 130 to correctly process the information content of the associated message field that immediately follows the Status Information Field.

The Status Information Field 402 comprises an application-layer protocol identifier, preferably represented by two hexadecimal digits. Preferably, the application-layer protocol is FLEXinfo™ and the application-layer protocol identifier for FLEXinfo is preferably "80". The absence of the application identifier indicates that the message is a regular selective call message Alternatively, a different application identifier indicates that the message is a regular selective call message. As can be appreciated from FIG. 4, the Status Information Field is the first portion of the message 316.

Alternatively, a Global Status Information Field (not shown, but substantially similar to the Status Information Field 402) can precede the Status Information Field 402. A Global Status Information Field comprises bytes that form a global identifier and bytes that indicate the size of the global payload. Examples of Global Status Information Fields are compression and scrambling, i.e., encryption. The global identifier is preferably two hexadecimal digits The global identifier for encryption is preferably "F0". The encryption for FLEXsuite is preferably carried out using the technique taught in U.S. Pat. No. 5,283,832 entitled Paging Message Encryption, issued Feb. 1, 1994, to Lockhart, Jr. et al., which is assigned to the assignee of the present invention, and which is hereby fully incorporated by reference herein. Multiple global protocols can be concatenated in a single transmission by transmitting successive Global Status Information Fields. Included within the Global Status Information Field is an indication of the FLEXsuite message size, or length, of the FLEXsuite payload (in number of bytes). The indication of the message size allows a plurality of FLEXsuite messages to be transmitted within a single FLEX message, such as message 316. In the example pictorially represented in FIG. 4, the FLEXsuite message size comprises the bytes within blocks 403–427, which, in this example, represent only one FLEXsuite message, i.e., a FLEXinfo command.

A selective call device 130 receives an original information services message in conventional ways, preferably through the use of a FLEXinfo Original Message Command. It should be understood that an information service provider computer (not shown), preferably located at each provider of the information services 140–146, is programmed to construct original messages using the Original Message Command. Every Original Message Command is transmitted with a single Major Version Number. The information service provider computer sets the value of the Major Version Number. The actual value of the Major Version Number is arbitrary, but for purposes of more easily understanding the invention, it shall be assumed that a first Original Message Number has a Major Version Number of zero. For subsequent, different Original Message Commands addressed to a particular selective call device 130, the information service provider computer increments the Major Version Number by one. Notwithstanding the foregoing, duplicate Original Message Commands can be sent to a particular selective call device 130 to ensure receipt by the selective call device of an Original Message Command. In which case, the selective call device 130 utilizes the first command it successfully receives or the command it receives with the fewest errors. Preferably, the Original Message Command does not include any Minor Version Numbers; however, the absence of Minor Version Numbers is interpreted by the information service provider computer and by the selective call device as if each Topic included within the Original Message Command has an associated Minor Version Number of zero Alternatively, the Original Message Command includes an array of Minor Version Numbers, that is, one Minor Version Number for each Topic included within the command. Alternatively, the Major Version Number can be used in connection with updating normal maildrops, that is, non-FLEXinfo, normal ASCII messages that were sent to a selective call device without sub-addresses, or Topics. In accordance with the invention, normal maildrops are updated with a FLEXinfo update command by using the least significant four bits of a Message Sequence Number from the header of the FLEX transport-layer communication protocol as the Major Version Number. As is well known, the selective call system 100 generates the Message Sequence Number. Therefore, in order to update a normal maildrop message, the provider of the information services 140–146 must receive the Message Sequence Number from the selective call system 100 so that the information service provider computer can construct the update command using a portion of the Message Sequence Number as the Major Version Number.

The formatting of an information services message is more fully explained in U.S. patent application having Ser. No. 08/807,933 entitled Selective Call Message Formatting, filed Feb. 28, 1997, by Nelms, et al. currently pending assigned to the assignee of the present invention, and which is hereby fully incorporated by reference herein. Battery saving by a selective call device 130 that subscribes to an information service, and a description of FLEXinfo commands related thereto, are more fully described in U.S. patent application having Ser. No. 08/806,972 entitled Selective Call Device And Method For Battery Saving During Information Services, filed Feb. 26, 1997, by Nelms et al., now U.S. Pat. No. 5,929,773 assigned to the assignee of the present invention, and which is hereby fully incorporated by reference herein.

Figure 6:
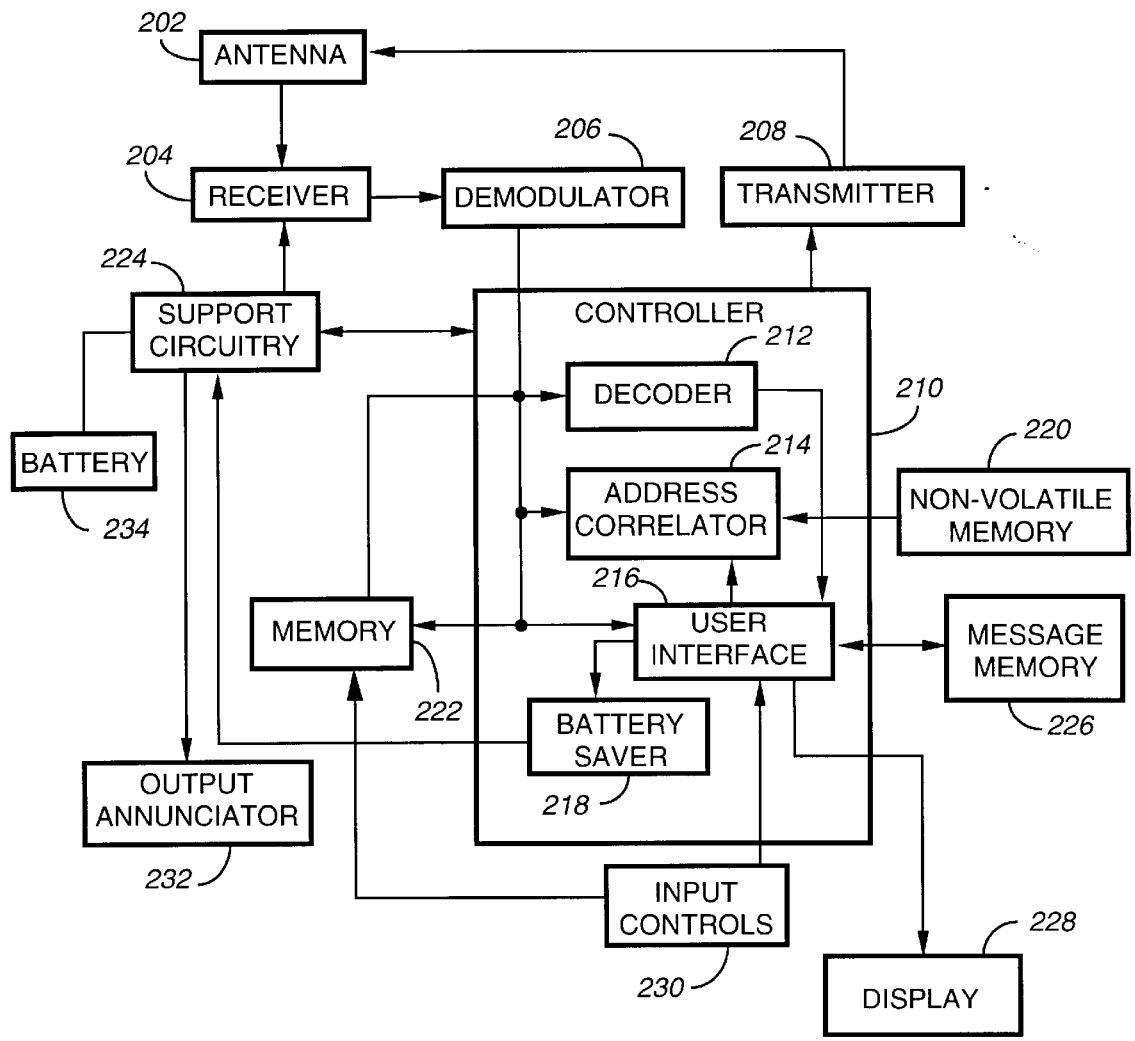
FIG. 6 is an electrical block diagram of a selective call device in accordance with the preferred embodiment of the present invention.

Following the FLEXsuite Status Information Field 402, each FLEXinfo command has a unique Command Identifier 403. The Command Identifier 403 is preferably an expandable unsigned integer Updates to previously received information services messages are accomplished through the use of one of two types of update commands that allow selected portions, or fields, of an original message to be efficiently updated with minimal overhead. One of the update commands, a Sequential Topic Range Update Command 400, is transmitted following the FLEXsuite Status Information Field 402 within the FLEXsuite embedded protocol message 401. The Sequential Topic Range Update Command 400 comprises blocks 403–427 of FIG. 4. Preferably, the topics of each information service are designated by unique numbers to facilitate the correlation between the topics and sub-addresses. For each sub-message, there is a corresponding sub-address. In the Sequential Topic Range Update Command 400, a sequential range of topics method designates a range of the information topics that are included in the update message, e.g., as the explicitly designated first topic and an implicitly designated last topic described as an offset from the first topic. A Content Length 404 specifies the size of the Sequential Topic Range Update command, i.e., it specifies the number of bytes from block 405 through block 427, inclusive. The next field in the Sequential Topic Range Update Command 400 is a Data Translation Identifier 405. The Data Translation Identifier is preferably four bits in length. The Data Translation Identifier 405 identifies which of several data translation algorithms, such as ASCII or Numeric, was used to encode the associated data in the Sequential Topic Range Update Command. Although ASCII is the preferred data translation algorithm when sending an original message to a selective call device 130, updates are preferably sent using a numeric data translation algorithm, such as Standard Numeric or Financial Numeric. Updates are transmitted in any of the popular four-bit numeric, seven and eight-bit alphanumeric, and eight-bit hexadecimal formats producing the most tightly packed data. Through the use of the Data Translation Identifier 405, the selective call device 130 can properly convert the message to the format in which the message is stored in a memory element, such as message memory 226 (FIG. 6).

After the Data Translation Identifier 405, there is a Major Version Number 406 having a size, or length, of four bits, thereby allowing up to sixteen different Major Version Numbers. Through the use of the Major Version Number, the updating of an old sub-message with data meant for a newer, more recent, sub-message can be prevented. The Major Version Number 406 is used to verify that an update is valid for an existing sub-message. There is one Major Version Number in a FLEXinfo command. If a value of the Major Version Number 406 of an update command does not match a value of the Major Version Number stored in the selective call device 130 for the topic(s) included in the update command, then none of the update data in the update command is used to update information displayed on the selective call device. It should be pointed out that all Topics included in a single update command share the same one Major Version Number because the Major Version Number is associated with a sub-message template and all sub-addresses, or Topics, within a single FLEXinfo command share a same sub-message template. Provision of the Major Version Number 406 forces the selective call device 130 to receive a new original message before any updates are displayed, thereby eliminating false or misleading reports.

The controller 210 (FIG. 6) in the selective call device 130 derives the range of the information topics from a Base Topic 407, which designates the beginning sub-address that will be transmitted, and from a Number of Additional Topics 408, which defines a number N of additional topics after the Base Topic 407 to which the command is applied. For example, if the beginning topic number is ninety-eight, then the hexadecimal value "62" appears in the field for Base Topic 407. For example, if the total number of information services topics is seven, then the hexadecimal value "06" appears in the field for Number of Additional Topics 408. Unlike known methods which use sub-addresses of a predetermined length, the Base Topic 407 and the Number of Additional Topics 408 are advantageously unsigned expandable integers. A byte expansion flag in the most significant position of an expandable integer field indicates whether the expandable integer extends over more than one byte. Each topic has a unique integer associated therewith. By designating the topic sub-address in a sequential manner, e.g., either in ascending or descending order with unique integers, the beginning topic sub-address and the ending topic sub-address identify the possible information service updates that are included within a given transmission. When the topic sub-address range does not include any topic sub-addresses of the information services to which the selective call device 130 is subscribed, the selective call device can skip to the next command (if there is another command) or can immediately shutdown, i.e., battery save. The Sequential Topic Range Update command also comprises a Number of Additional Fields 409 parameter that defines a number M of additional fields to update. The Number of Additional Fields parameter is preferably an unsigned expandable integer. For example, if there are no additional fields to update beyond the first field, then the value "00" is transmitted in block 409. The Sequential Topic Range Update command also comprises a Field Offsets 410 array of M+1 parameters. The Field Offsets 410 are an array of unsigned expandable integers that define, for each field in a topic, offsets to the first character of the field. The first field offset, Field Offset (0), is defined as the number of characters from the first character of the message. In the event the Data Translation Identifier 405 designates hexadecimal format, then the first field offset is defined as the number of bytes from the first character of the message. The second field offset, Field Offset (1), and all subsequent offsets to Field Offset (M), are defined as the number of characters (or bytes for hexadecimal format) from the character following the previous updated field in the message. The Sequential Topic Range Update Command 400 also comprises a Field Lengths 411 array of M+1 unsigned expandable integers that define a field length, in number of characters, for each of the fields that are to be updated. The Sequential Topic Range Update Command 400 also comprises an array of data strings, [Data(0,0), Data(0,1), Data(0,2) . . . Data(0,M), Pad Bits, Data(1,0), Data(1,1), Data(1,2) . . . Data(1,M), Pad Bits . . . Data(N,0), Data(N,1), Data(N,2) . . . Data(N,M), Pad Bits], immediately following the array of Field Lengths 411. The first entry in the array of data strings, Data (0,0), represents the updated information for the first field, i.e., Field Offset (0), of the Base Topic, i.e., Topic (0). The second entry in the array of data strings, Data (0,1), represents the update information for the second field, i.e., Field Offset (1), of the Base Topics i.e., Topic (0). In the example given above, the Base Topic is topic number ninety-eight. The entry Data (1,0) represents the updated information for the first field, i.e., Field Offset (0), of the next topic, i.e., Topic (1), in the sequential range of topics that are to be updated by the Sequential Topic Range Update Command 400. In the example given above, the next topic is topic number ninety-nine.

The last portion of the Sequential Topic Range Update Command 400 is an array of Minor Version Number(s) 427. There is one Minor Version Number 427 per Topic. Each Minor Version Number is preferably an eight-bit number, thereby producing two hundred fifty-six (0–255) different Minor Version Numbers. Alternatively, each Minor Version Number is a four-bit number, thereby producing sixteen (0–15) different Minor Version Numbers. Not every Topic subscribed to by a user of a selective call device 130 will necessarily be updated with the same frequency. Further, it should be clear by now that more than one Topic can be updated by a single update command. Therefore, a typical Sequential Topic Range Update Command 400 includes an array of Minor Version Numbers 427, each having a different value. Consequently, it can be expected that after a period of time, a particular Minor Version Number 427 associated with a frequently updated Topic will reach the highest possible value while the other Minor Version Numbers associated with less frequently updated Topics are at a lower value. According to one embodiment, after any Minor Version Number 427 has reached its highest value, a next update cannot be sent using an update command, rather, a next update must be sent to the selective call device 130 using a new Original Message Command having an incremented-by-one Major Version Number 406 and having the particular Minor Version Number 427 re-set to the lowest value, i.e., zero. Of course, if the Original Message Command also performs an update to any of the less frequently updated Topics, the Minor Version Number associated with each of those Topics is incremented by one.

According to a second embodiment, after a particular Minor Version Number 427 has reached its highest value, software in the information service provider computer and in the selective call device 130 performs rollover and the next update is sent to the selective call device using an update command, such as the Sequential Topic Range Update Command 400, with the Major Version Number 406 being unchanged and with only that particular Minor Version Number being re-set to zero. In such alternative rollover case, if the Sequential Topic Range Update Command also performs an update to any of the other Topics, the Minor Version Number 427 associated with each of those other Topics is incremented by one.

According to a third embodiment, instead of Minor Version Numbers 427 being a fixed number of bits in size, another alternative is that each Minor Version Number is an unsigned expandable integer, in such case, the need for rollover and the need to use a new Original Message Command to send an update are postponed indefinitely.

Figure 5:
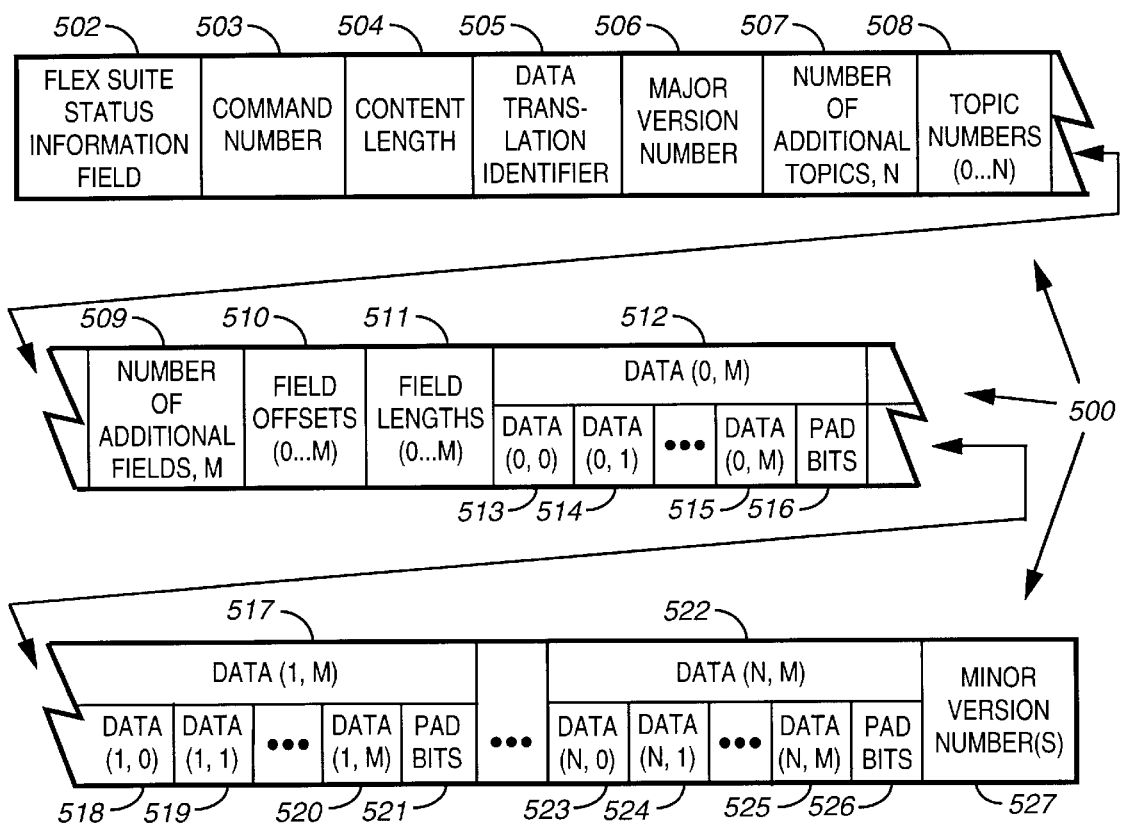

Referring now to FIG. 5, the other of the update commands, an Itemized Topic List Update Command 500, is transmitted following the FLEXsuite Status Information Field 502 within the FLEXsuite message 501. The Itemized Topic List Update Command 500 comprises blocks 503–527 of FIG. 5. It should be understood that the information service provider computer located at each provider of the information services 140–146 is programmed to construct update messages using both the Sequential Topic Range Update Command 400 and the Itemized Topic List Update Command 500, and to transmit to the selective call system via the telephone network updates using whichever command produces the shortest message. In the Itemized Topic List Update Command 500, a list designates the information topics that are included in the update message. A Content Length 504 specifies the size of the Itemized Topic List Update Command 500, i.e., it specifies the number of bytes from block 505 through block 527, inclusive. The next field in the Itemized Topic List Update Command 500 is a Data Translation Identifier 505. The Data Translation Identifier is preferably four bits in length. The Data Translation Identifier 505 identifies which of several data translation algorithms, such as ASCII or Numeric, was used to encode the associated data in the Itemized Topic List Update Command 500. Although ASCII is the preferred data translation algorithm when sending an original message to a selective call device 130, updates are preferably sent using a numeric data translation algorithm, such as Standard Numeric or Financial Numeric. After the Data Translation Identifier 505, there is a Major Version Number 506 having a size, or length, of one nibble. The method in accordance with the invention uses the Major Version Number of the Itemized Topic List Update Command 500 in substantially the same manner as the Major Version Number in the Sequential Topic Range Update Command 400.

A single FLEX address is generally pre-selected for each group of Topic Numbers (sub-addresses) sharing a similarly formatted sub-message; therefore, only one update command, such as the Sequential Topic Range Update Command 400 or the Itemized Topic List Update Command 500 (whichever is shortest), is used to efficiently send updates to multiple fields of multiple sub-messages, that is, to multiple fields of multiple information service topics. Such update command is part of an embedded protocol, or application-layer protocol, transmitted by the selective call system 100 within the message portion, such as block 316 of FIG. 3, of a standard transport-layer communication protocol format. The data of the multiple sub-messages comprise the data within composite blocks 412, 417 and 422 of FIG. 4 and composite blocks 512, 517 and 522 of FIG. 5. The sub-addresses associated with each of the sub-messages are the topic numbers appearing in blocks 407 and 408 of FIG. 4 and block 508 of FIG. 5. In those instances where a group of topic numbers shares more than one type of formatted message, the information service provider computer at one of the information services 140–146, constructs two update commands, one for each type of formatted message, and the selective call system 100 advantageously transmits the two update commands within one FLEXsuite payload within one message portion of a standard transport-layer communication protocol format.

All topic numbers in any one Itemized Topic List Update Command 500 are of the same length to eliminate error propagation. However, the length can dynamically change (zeros added or deleted from the most significant positions so as not to change the value of a topic number) from one command to another by the information service provider computer at one of the information services 140–146. The controller 210 in the selective call device 130 determines the length from the first topic in the Topic Numbers 508 field using the byte expansion flag(s) of the first topic number. The controller 210 in the selective call device 130 derives the information topics from a Number of Additional Topics 507, and from a list of Topic Numbers 508 that is an array, [Topic (0), Topic (1), Topic (2) . . . Topic (N)]. The Number of Additional Topics 507 defines a number N of additional topics after Topic (0), to which the command is applied. For example, if the total number of topics to be updated in the current command is three, then the number of additional topics is two, and the hexadecimal value "02" appears in the field for Number of Additional Topics 507 For example, if the beginning topic numbers that are to be updated in the current command are "98, 102 and 103", then the hexadecimal values "62 66 67" appear in the field labeled Topic Numbers 508. The Number of Additional Topics 507 and the Topic Numbers 508 are preferably expandable unsigned integers. When the topic sub-address range does not include any topic sub-addresses of the information services to which the selective call device 130 is subscribed, the selective call device can skip to the next command (if there is another command) or can immediately shutdown, i.e., battery save. The Itemized Topic List Update Command 500 also comprises a Number of Additional Fields 509 parameter that defines a number M of additional fields to update. The Itemized Topic List Update Command 500 also comprises a Field Offsets 510 array of M+1 parameters. The Field Offsets 510 are an array of expandable unsigned integers that define, for each field in a topic, offsets to the first character of the field The first field offset, Field Offset (0), is defined as the number of characters from the first character of the message. in the event the Data Translation Identifier 505 designates hexadecimal format, then the first field offset is defined as the number of bytes from the first character of the message. The second field offset, Field Offset (1), and all subsequent offsets to Field Offset (M), are defined as the number of characters (or bytes for hexadecimal format) from the character following the previous updated field in the message. The Itemized Topic List Update Command 500 also comprises a Field Lengths 511 array of M+1 expandable unsigned integers that define a field length, in number of characters, for each of the fields that are to be updated. The Itemized Topic List Update Command 500 also comprises an array of data strings, [Data(0,0), Data(0,1), Data (0,2) . . . Data(0,M), Pad Bits, Data(1,0), Data(1,1), Data (1,2) . . . Data(1,M), Pad Bits . . . Data(N,0), Data(N,1), Data(N,2) . . . Data(N,M), Pad Bits], immediately following the array of Field Lengths 511. The first entry in the array of data strings, Data (0,0), represents the updated information for the first field, i.e., Field Offset (0), of the Base Topic, i.e., Topic (0). The second entry in the array of data strings, Data (0,1), represents the updated information for the second field, i.e., Field Offset (1), of the Base Topic, i.e., Topic (0). In the example given above, the Base Topic is topic number "98". The last portion of the Itemized Topic List Update Command 500 is an array of Minor Version Number(s) 527. The method in accordance with the invention uses Minor Version Number(s) of the Itemized Topic List Update Command 500 in substantially the same manner as Minor Version Number(s) in the Sequential Topic Range Update Command 400.

FIG. 6 shows an electrical block diagram of a selective call device according to the preferred embodiment of the present invention. The selective call device 130 is powered by a battery 234 and operates to receive and to transmit radio frequency signals via an antenna 202. A receiver 204 is coupled to the antenna 202 to receive the radio frequency signals. A demodulator 206 is coupled to the receiver 204 to recover any information signal present in the radio frequency signals using conventional techniques. The recovered information signal from the demodulator 206 is coupled to a controller 210 that decodes the recovered information in a manner well known to those skilled in the art.

In the preferred embodiment, the controller 210 comprises a microcomputer, such as a Model MC68HC11PH8 microprocessor manufactured by Motorola, Inc. and comprises a signal processor performing the functions of a decoder which is normally implemented in both hardware and software. The signal processor comprises an address correlator 214 and a decoder 212, using methods and techniques known to those skilled in the art. The address correlator 214 checks the recovered information signal from the output of the demodulator 206 for address information and correlates a recovered address with one of a plurality of predetermined addresses that are stored in a non-volatile memory 220. After the address correlator 214 determines that the received signal is directed to the selective call device 130, e.g., by correlating the address in the received signal to one of the predetermined addresses in the non-volatile memory 220, the decoder 212 decodes the signal for the application identifier to determine if the message contains information services data. Absence of the application-layer protocol identifier in the Status Information Field 402 and 502 (FIGS. 4 and 5) indicates that the message being decoded is a regular selective call message. Conversely, when the application-layer protocol identifier is present and when it correlates to an information service application such as FLEXinfo, the message is an information service message. The transport-level communication protocol addresses for the information services is preferably stored in non-volatile memory 220, and the application-layer protocol identifier, the Command Identifier 403, and the topic numbers (or sub-addresses), are preferably stored in a memory 222.

When the user of the selective call device 130 has subscribed to at least one information service, the memory 222 is programmed with the information service addresses and associated topic numbers (or sub-addresses). Each information service has a unique address and a plurality of unique topic numbers that allows the selective call device 130 to determine when the subscribed information service 140–146 is present within a particular transmission. A topic number can be a short form of an information service address, but preferably a topic number is totally different from an information address while still being able to identify the presence of the information service topic within a particular transmission.

Status information is stored in memory 222 and indicates the information service that the selective call device 130 is programmed to receive. Subsequent to the decoder decoding the presence of an application-layer protocol identifier in the Status Information Field 402, the decoder decodes the Command Identifier 403 indicating, for example, that a Sequential Topic Range Update Command 400 was received.

Figure 7:
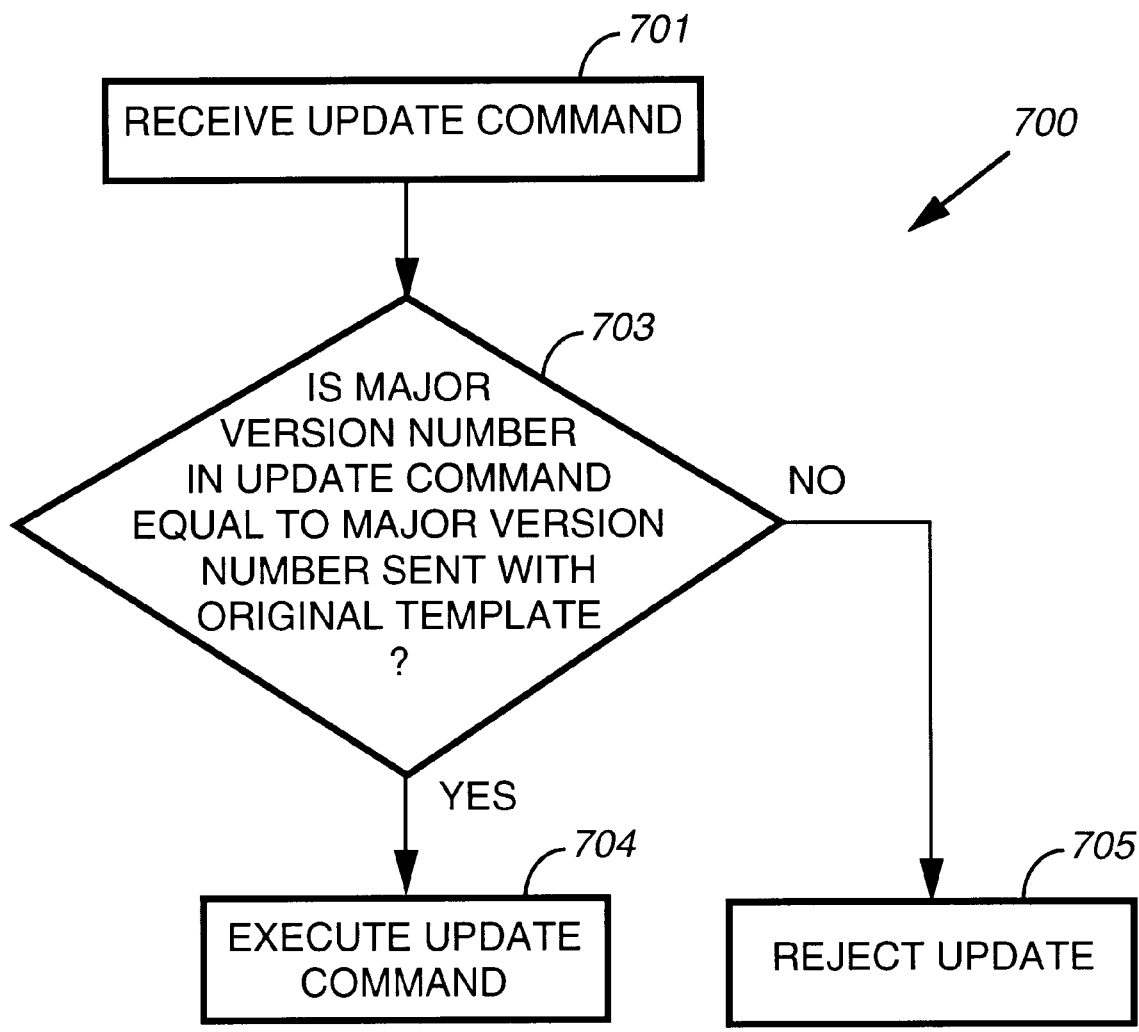
FIG. 7 is a flow diagram showing steps executed by the selective call device with regard to a Major Version Number.

FIG. 7 is a flow diagram 700 of the steps executed by the controller 210 in the selective call device 130 with regard to the Major Version Number. At step 701, the selective call device receives an update command, such as the Sequential Topic Range Update Command 400 or the Itemized Topic List Update Command 500. Next, the selective call device decodes the Major Version Number 406. At step 703, the controller compares the Major Version Number with a current Major Version Number stored in memory 222. If the Major Version Number 406 is equal to the current Major Version Number, the selective call device decodes the rest of the update command, at step 704, otherwise, the selective call device rejects the update data, at step 705.

Next, the decoder decodes the Base Topic 407, i.e., first sub-address, and the Number of Additional Topics 408, or sub-addresses, and the data in composite blocks 412, 417 and 422 The decoder further decodes the Content Length 404 to determine the end of the command.

Figure 8:
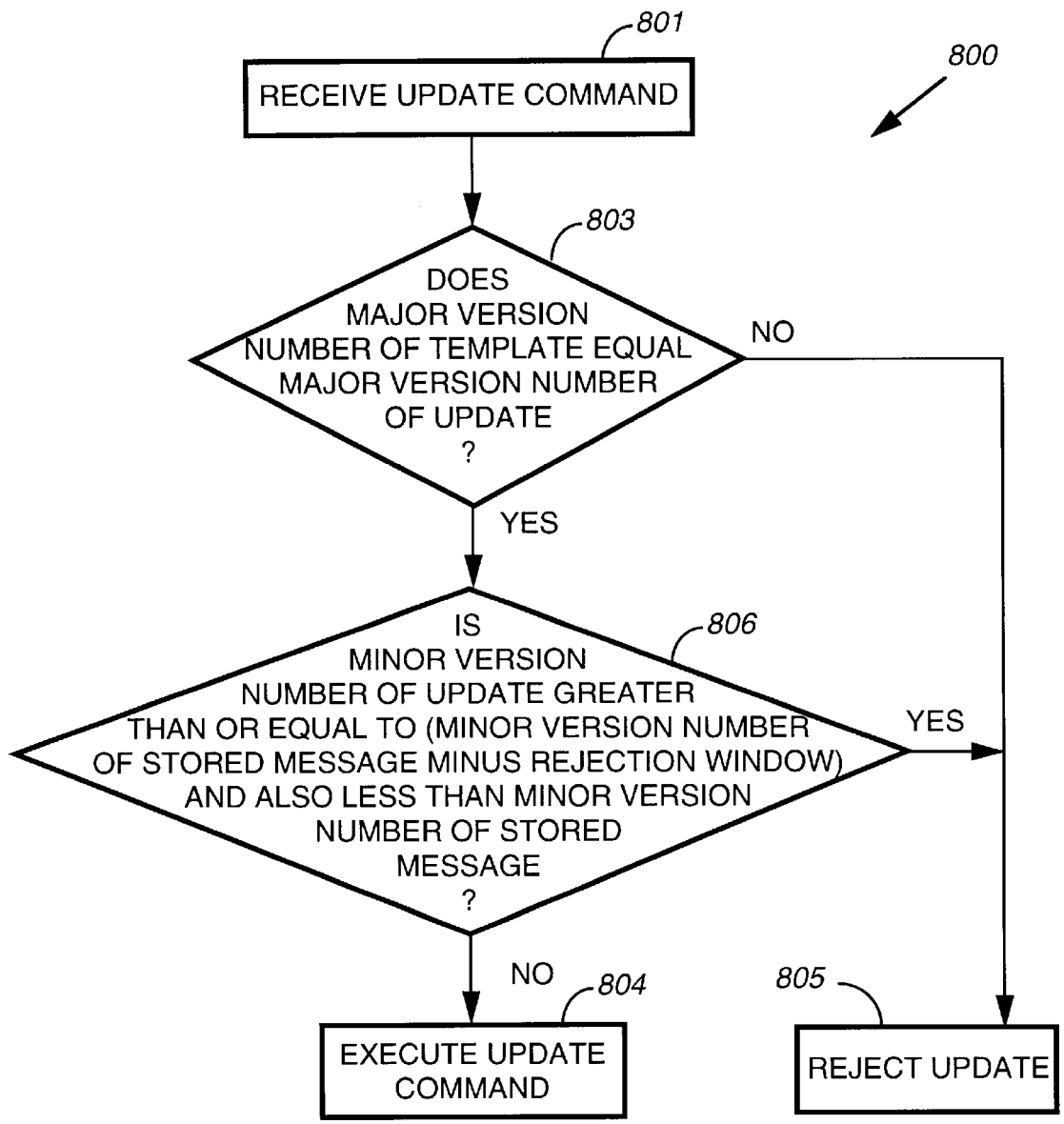
FIG. 8 is a flow diagram showing steps executed by the selective call device with regard to a Minor Version Number.

FIG. 8 is a flow diagram 800 of the steps executed by the controller 210 in the selective call device 130 with regard to the Minor Version Number. At step 801, the selective call device receives an update command, such as the Sequential Topic Range Update Command 400 or the Itemized Topic List Update Command 500. Next, the selective call device 130 decodes the Minor Version Numbers 427. At step 803, the controller 210 compares the value of each Minor Version Number in the update command with the value of the last previously received Minor Version Number for each Topic within the range of the command. For each Topic Number, the selective call device 130 selectively, separately determines whether to update the sub-messages stored in message memory 226 depending upon the value of the associated Minor Version Number 427. For each Topic Number, if the Minor Version Number 427 in the update command is greater than the last previously received Minor Version Number stored in memory 222, then the corresponding Topic, or sub-message, is updated with the data in the command, step 804; otherwise, the update is rejected, step 805. For example, if the last previously received Minor Version Number for a particular Topic is "200", then the selective call device updates the particular Topic, or sub-message, when the Minor Version Number in the update command is "204". If the Minor Version Number 427 in the update command is equal to the last previously received Minor Version Number stored in memory 222, then the corresponding Topic, or sub-message, is also updated with the data in the command. This permits duplicate updates to be sent to ensure delivery. The selective call device 130 that does not recognize rollover does not update any Topic, or sub-message, when the Minor Version Number 427 in the update command has any value less than the last previously received Minor Version Number.

However, the selective call device 130 that recognizes rollover does not update any Topic, or sub-message, when the Minor Version Number 427 in the update command has a value within a moving rejection window of values less than the last previously received Minor Version Number, step 806. Preferably, the rejection window contains ten values. For example, if the last previously received Minor Version Number is "23", then the selective call device 130 does not update any Topic, or sub-message, when the Minor Version Number in the update command has a value within the rejection window of "13 to 22", inclusive. For a second example, if the last previously received Minor Version Number is "249", then the selective call device 130 does not update any Topic, or sub-message, when the Minor Version Number in the update command has a value within the rejection window of "239 to 248", inclusive. By rejecting updates having slightly smaller Minor Version Numbers, the selective call device 130 advantageously rejects slightly older update information which is delayed in the selective call system 100 and transmitted after the newest data. By limiting the size of the rejection window to ten values, the selective call device 130 is advantageously capable of receiving, i.e., does not reject, updates after having been out-of-range for a period. That is, the selective call device does receive updates with Minor Version Numbers having a value smaller (older) than the smallest (oldest) rejection window value. A third example is applicable only when rollover of Minor Version Numbers is recognized. If the last previously received Minor Version Number is "7", then the selective call device does not update any Topic, or sub-message, when the Minor Version Number in the update command has a value within the rejection window of "253 to 6", inclusive.

If the topic number corresponding to the information service(s) being subscribed to by the selective call device is not within the range of the Base Topic 407 and the topic end address, the decoder decodes the next command (if there is another command) otherwise, the decoder 212 strobes a user interface 216 causing the battery saver 218 to disable or remove power from the receiver 204 via a support circuitry 224.

On the other hand, when the Itemized Topic List Update Command 500 is decoded, the Number of Additional Topics 507 is decoded followed by the itemized Topic Numbers 508, or sub-addresses. Alternatively, the Number of Additional Topics 507 and the itemized Topic Numbers 508 sets of parameters are replaced, respectively, by a first topic number and a set of numerical differences between each additional topic number and the topic number that preceded the additional topic number. In such case, the differences are decoded, and software stored in non-volatile memory 220 determines Topic Numbers 508 therefrom. If the selective call device does not decode an address corresponding to one of its subscribed information services (or a topic number corresponding to one of its subscribed topic numbers), the decoder decodes the next command (if there is another command) otherwise, the battery saver 218 initiates the removal of power to the receiver 204

Conversely, when a subscribed topic number is found within the itemized list of Topic Numbers 508, the controller 210 further decodes the command, including the information data in composite blocks 512, 517 and 522. The controller 210 recovers the topic numbers for the selected information service sent to the selective call device 130 and when it correlates with the topic numbers stored in memory 222, the decoder 212 decodes the message and stores the decoded message in message memory 226.

In this way, subsequent to the selective call device 130 verifying that the received information is directed to it, the selective call device 130 further decodes the received information to determine if it includes any information services data directed to the selective call device 130. As is well known, information service 140–146 providers package the updates, and a selective call system 100 provider transmits the updates, and any selective call device 130 that is authorized to receive the information services 140–146 will receive the updates.

After receiving, decoding, and storing the selected information service in the message memory 226, the selective call device 130 typically presents at least a portion of the stored message to a user, such as by a display 228, e.g., a liquid crystal display. Additionally, along with receiving, decoding, and storing the information, an alert is presented to the user via an output annunciator 232. The support circuitry 224 preferably comprises a conventional signal multiplexing integrated circuit, a voltage regulator and control mechanism, a current regulator and control mechanism, audio power amplifier circuitry, control interface circuitry, and display illumination circuitry. These elements are arranged to provide support for the functions of the selective call device 130 as requested by a user.

Additionally, the controller 210 determines from the enabled or disabled status information in the memory 222 whether to conserve power upon detection of an address information. That is, when a received and recovered address correlates with a predetermined address in non-volatile memory 220, the controller 210 checks the status information corresponding to the correlated predetermined address information to determine whether that address is enabled. If the controller 210 determines that the correlated predetermined address is not enabled, then the decoder 212 is not invoked. Input controls 230 are coupled to the memory 222 and to the user interface 216 for receiving user inputs, including but not limited to programming, manipulating data, and sending commands to the selective call device 130. A selective call device alternatively includes a transmitter 208 for responding to information services sub-messages.

In addition to battery saving when the transport-layer communication protocol address of the selective call device 130 is not received, the selective call device 130 can battery save when it determines that the information service or updates thereto do not contain the particular topics subscribed to by the selective call device 130. In this way, the information services are identified by information service addresses and topic numbers (sub-addresses) which are transmitted with the information services messages to enable the selective call devices 130 to determine when a transmission includes the topics to which it subscribes. Since there are a large number of available information service topics, the battery life would be quickly depleted if the selective call device was required to search all transmissions for a subscribed to information service 140–146. Therefore, by checking for the information service address and the topic number, the selective call device is able to initiate battery saving.

Figure 9:
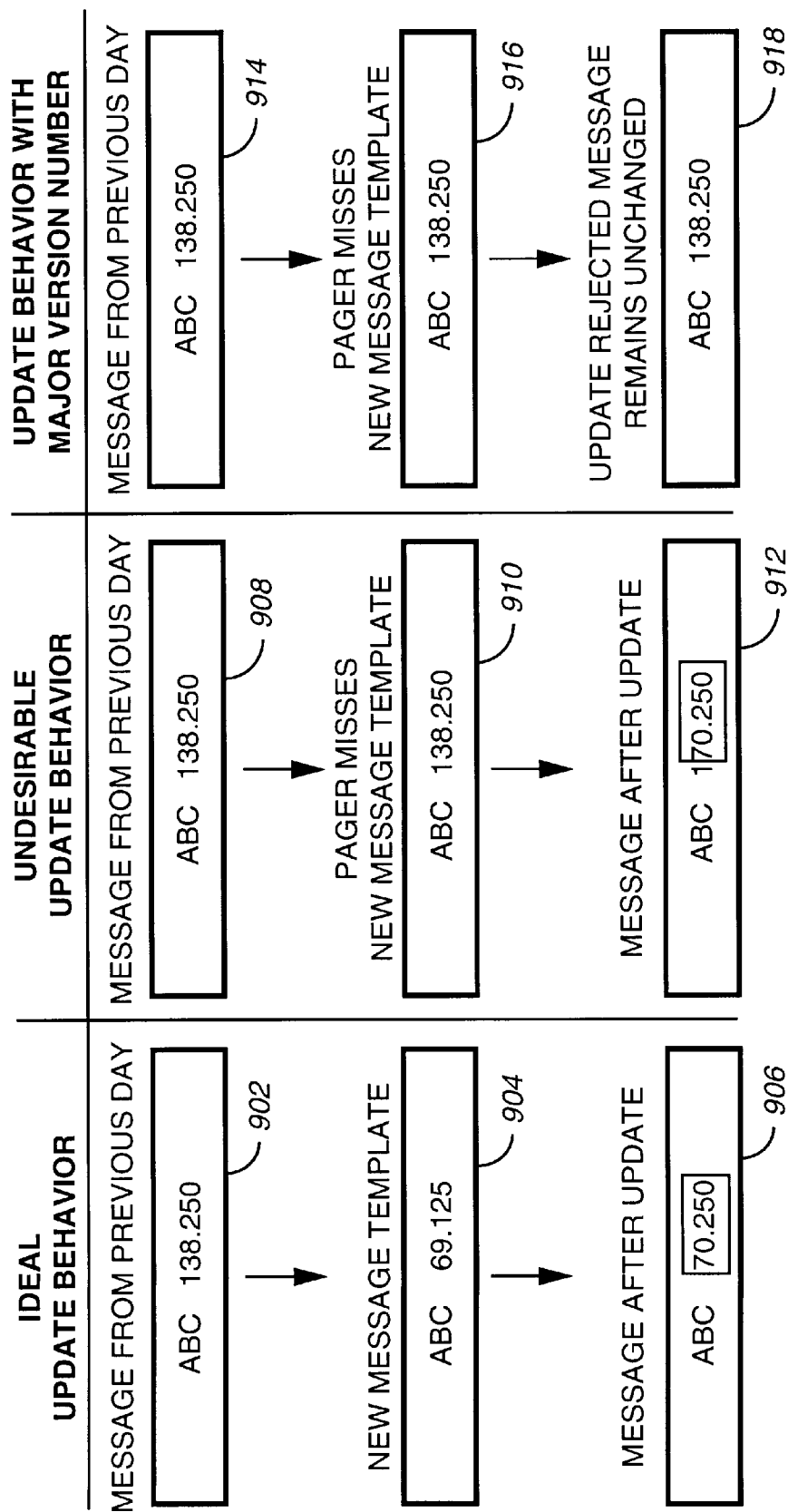
FIG. 9 is a set of examples of sub-messages as presented on a display of a selective call device after transmission of an original message command, after transmission of a second original message command, and after transmission of an update command.

FIG. 9 is a set of examples of sub-messages as presented on a display of a selective call device 130 after transmission of an original message command, after transmission of a second original message command, and after transmission of an update command. For example, an information service 140–146 transmits daily new message templates, usually overnight, and periodic updates throughout the day. Stock ABC splits two for one and a new template is transmitted overnight that reflects the new stock price. A particular selective call device is subscribing to the Topic corresponding to stock ABC, but misses the new template because the user temporarily took the selective call device out-of-range of the selective call system 100. When the user brings the selective call device 130 in-range, the selective call device resumes receiving the periodic updates. Without provision of a Major Version Number to prevent updates to a wrong template, the selective call device updates whatever sub-message was currently stored in message memory 226 and displays erroneous information.

Displays 902, 904 and 906 are a chronological representation of sub-messages under ideal circumstances, that is, when the selective call device is never out-of-range Display 902 shows the sub-message corresponding to the Topic for ABC stock received on a first day with the stock price being "138.250". A new template is sent to the selective call device thereby producing display 904 which shows the sub-message corresponding to the Topic for ABC stock on a second day with the stock price being "69.125". Later on the second day, an update is sent which produces the accurate display 906.

Displays 908, 910 and 912 are a chronological representation of sub-messages under circumstances when the selective call device is out-of-range when the new template is sent. As a result of not having received the new message template via a new Original Message Command, the selective call device incorrectly updates the sub-message, as shown in display 912.

Displays 914, 916 and 918 are a chronological representation of sub-messages under circumstances when the selective call device is out-of-range when the new template is sent, but using Major Version Numbers 406, 506 in accordance with the invention. Display 914 shows the sub-message corresponding to the Topic for ABC stock received on a first day with the stock price being "138.250". For understanding this example, it is not relevant whether this sub-message resulted from an Original Message Command or from an update command having been received by the selective call device 130. What is relevant is that the command included a Major Version Number 406, 506 and that the selective call device in accordance with the invention stores this Major Version Number in memory 222. On the second day, the selective call system 100 sends a new Original Message Command having an incremented-by-one Major Version Number because of a change in the template. The change in the template was necessitated by a stock split. If received, display 904 would have been produced. However, in this example, at the time the new Original Message Command is sent, the selective call device 130 is out-of-range, and therefore, the display 916 remains unchanged. Later on the second day, an update command is sent to the selective call device 130, the update command including the incremented-by-one Major Version Number. The selective call device is no longer out-of-range and receives this update command. The controller 210 of the selective call device 130 compares the Major Version Number included in the update command with the last previously received Major Version Number stored in memory 222, and advantageously does not update the display because the Major Version Numbers are not equal. Display 918 shows that which is displayed on the selective call device after the selective call device received the rejected update command. As can be seen, Display 918 shows the same information as Display 916. The method in accordance with the invention allows the older (but accurate when sent) information to remain in message memory 226 and rejects the update data in the recently received update command because such data would produce incorrect information on the display of the selective call device.

Figure 10:
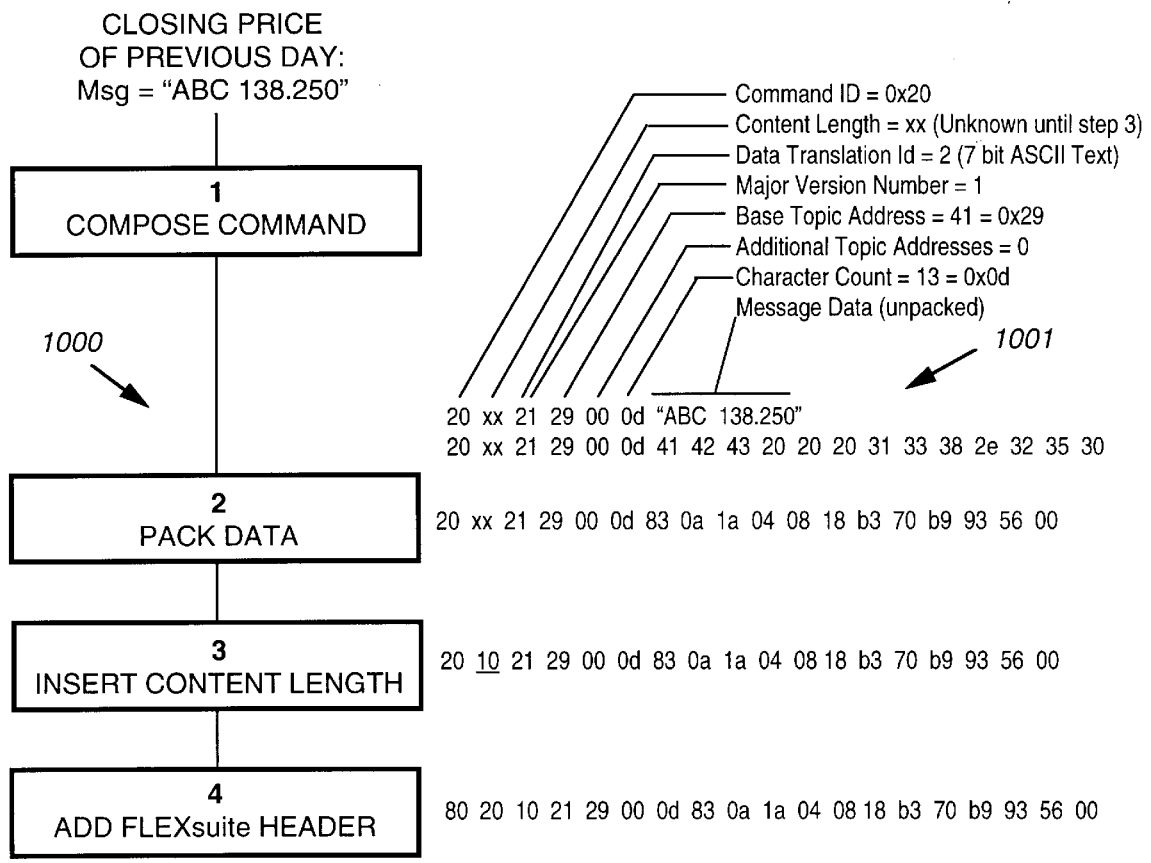
FIGS. 10 and 11 are flow diagrams showing creation of the original message commands used to produce two of the sub-messages shown in FIG. 9.

FIG. 10 is a flow diagram 1000 showing creation of the original message command 1001 used to produce the sub-messages shown in displays 902, 908 and 914 shown in FIG. 9.

Figure 11:
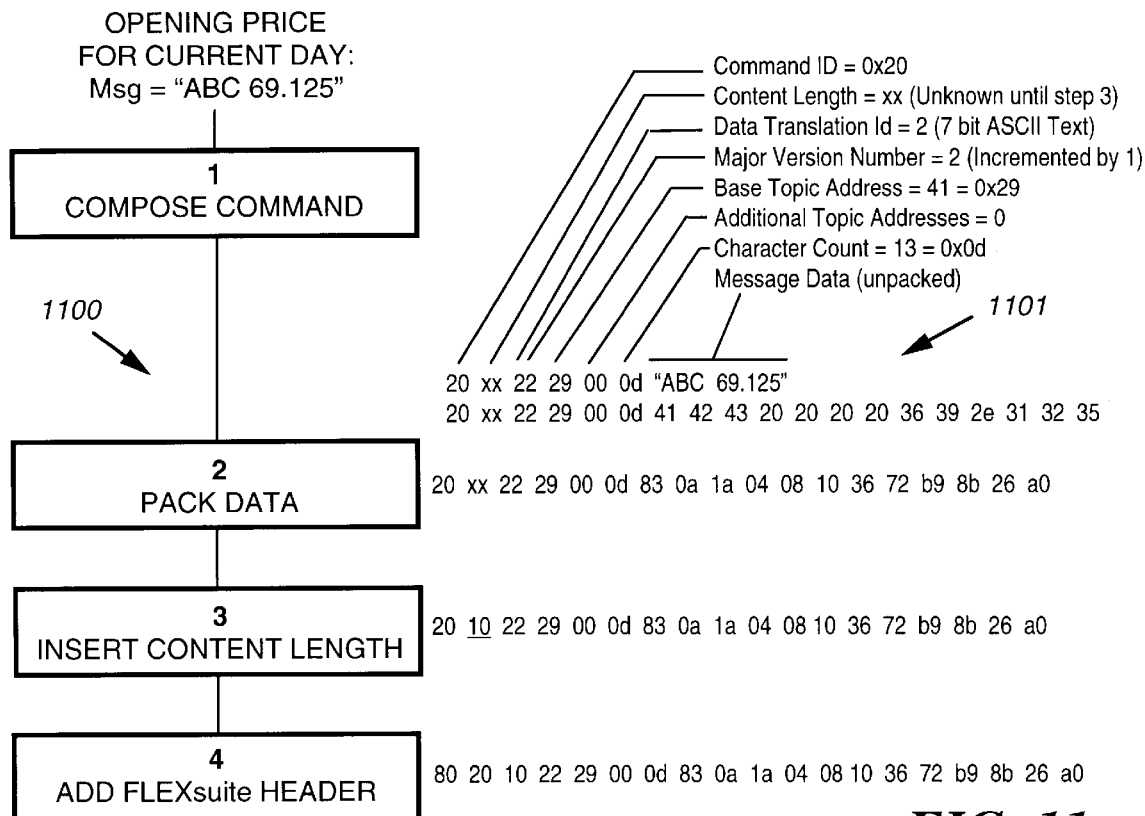

FIG. 11 is a flow diagram 1100 showing creation of an original message command 1101 used to produce the sub-message shown in display 904 of FIG. 9.

Figure 12:
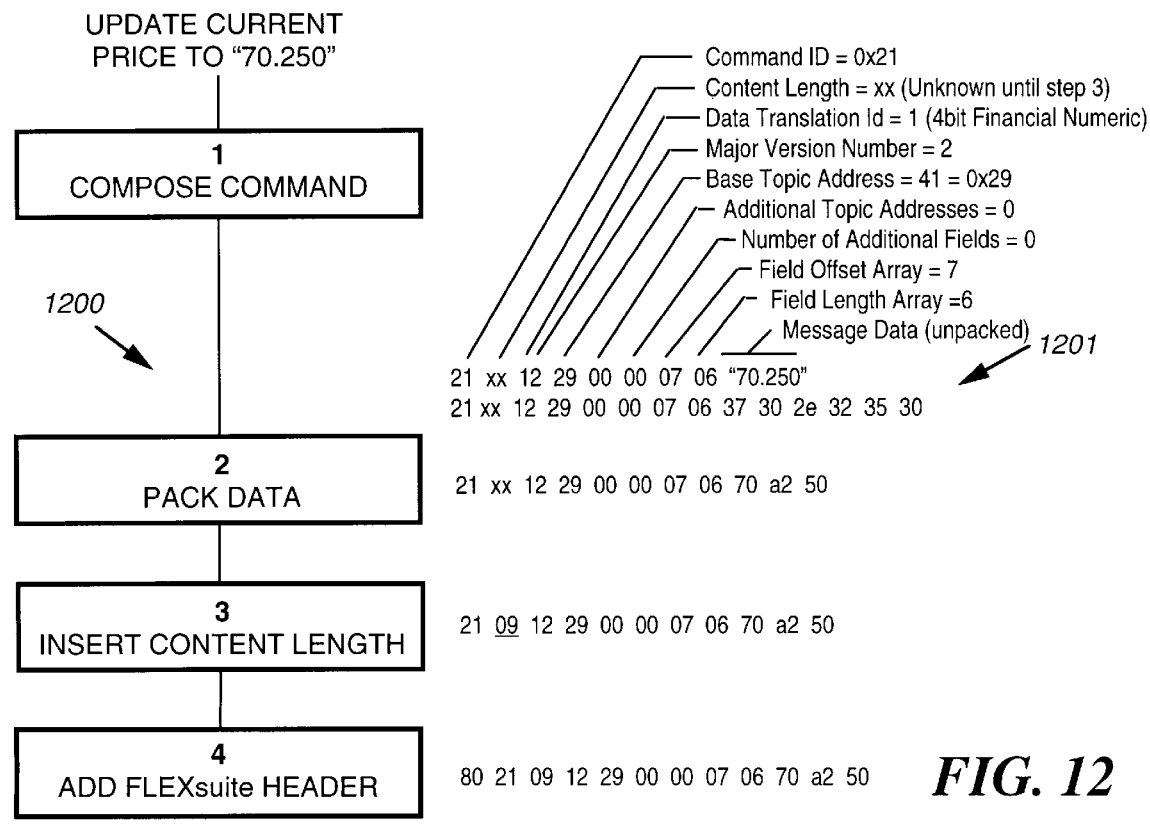
FIG. 12 is a flow diagram showing creation of the update command used to update the second sub-message shown in FIG. 9.

FIG. 12 is a flow diagram 1200 showing creation of an Itemized Topic List Update Command 1201 used for updating the sub-message shown in display 904 in order to produce the sub-message shown in display 906 of FIG. 9.

Figure 13:
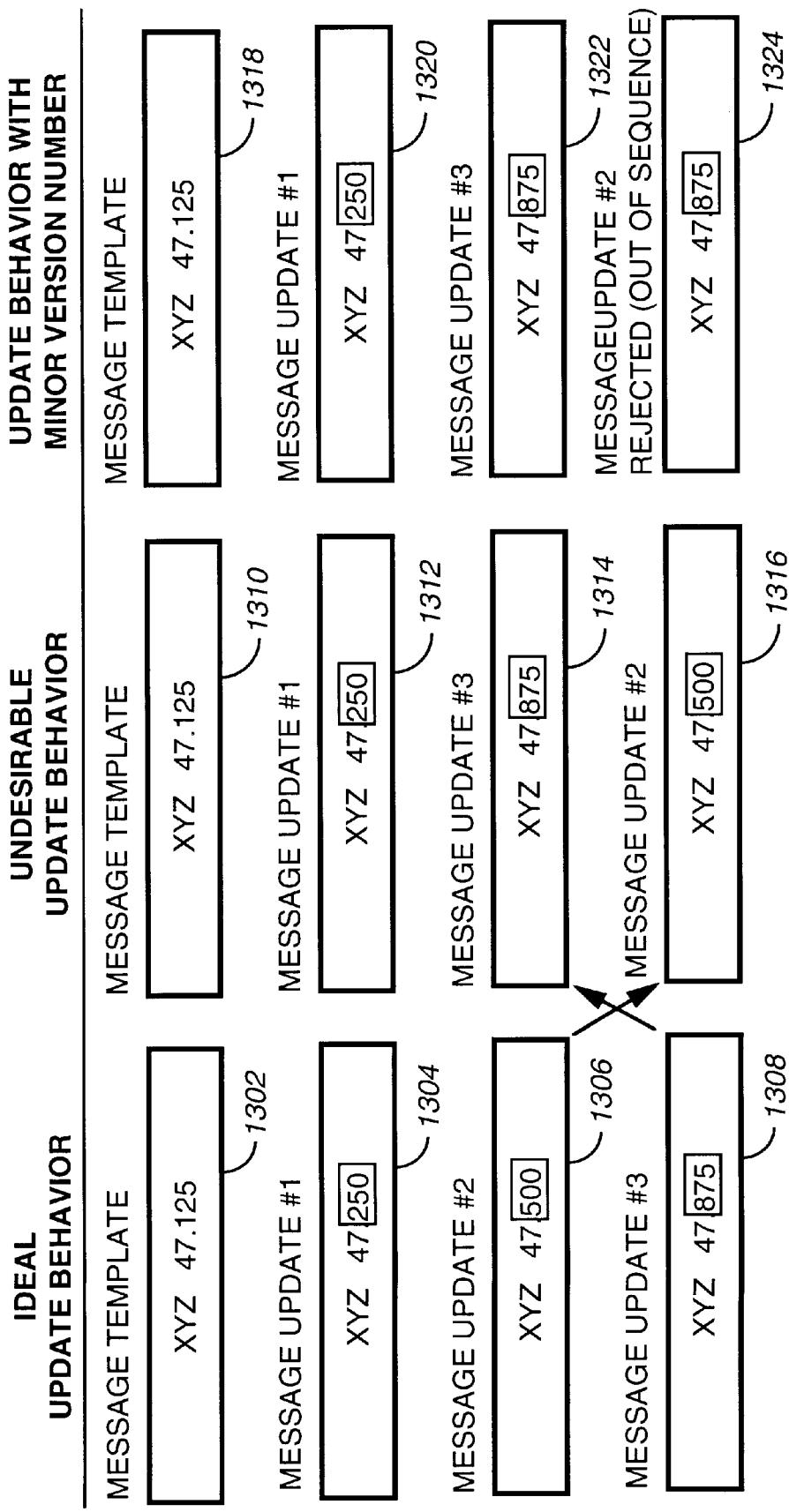
FIG. 13 is a set of examples of a sequence of four sub-messages as presented on a display of a selective call device.

FIG. 13 is a set of examples of a sequence of four sub-messages as presented on a display of a selective call device. For example, an information service transmits stock quotes every 30 seconds. Under normal circumstances, the selective call device receives updates in chronological order and there is no problem. Perhaps because of heavy message traffic, the selective call system 100 sends the updates out of order. The potential for a selective call device 130 to receive out of order updates is greater if the selective call device is a roaming device because the device receives updates on multiple channels, each with a different transmission delay. The Minor Version Numbers 427, 527 allow the selective call device to detect and reject out of sequence updates thereby preventing the selective call device from displaying erroneous information.

Displays 1302, 1304, 1306 and 1308 are a chronological representation of sub-messages under ideal circumstances, that is, when the selective call device 130 receives all updates (update#1, update#2 and update#3) in proper sequence, that is, in the sequence that the information service computer submitted the updates to a selective call system 100. Displays 1302, 1304, 1306 and 1308 show stock XYZ continually increasing in price, with "47.875" being the most recent price. Displays 1310, 1312, 1314 and 1316 are a chronological representation of sub-messages when update#2 and update#3 are received out of order. Without Minor Version Numbers, the sub-messages of display 1314 and 1316 are temporally incorrect. Displays 1302, 1304, 1306 and 1308 no longer show stock XYZ continually increasing in price, and display 1316 incorrectly shows "47.500" as the most recent price. Displays 1318, 1320, 1322 and 1324 are a chronological representation of sub-messages when update#2 and update#3 are received out of order, but when using Minor Version Numbers 427, 527 in accordance with the invention. The display 1318 results from the selective call device 130 having received an Original Message Command that includes a Topic Number associated with XYZ stock, price data for XYZ stock, and a Minor Version Number corresponding to this particular update of XYZ stock. In accordance with the invention, the selective call device stores the Minor Version Number in memory 222. Thereafter, the selective call device receives update#1. Update#1 includes a same Topic Number associated with XYZ stock, updated price data for XYZ stock, and an incremented-by-one Minor Version Number corresponding to this particular update of XYZ stock. Update#1 results in display 1320 because the Minor Version Number included within update#1 is higher than the value of the last previously received Minor Version Number stored in memory 222. The selective call device then stores the higher Minor Version Number in memory 222, replacing the previous, lower Minor Version Number. Thereafter, the selective call device receives update#3. Update#3 includes a same Topic Number associated with XYZ stock, newer updated price data for XYZ stock, and an incremented Minor Version Number corresponding to this particular update of XYZ stock. Update#3 results in display 1322 because the Minor Version Number included within update#3 is two units higher than the value of the last previously received Minor Version Number stored in memory 222. Display 1322 correctly shows the price of XYZ stock as "47.875". Thereafter, the selective call device receives update#2. Update#2 includes a same Topic Number associated with XYZ stock, older updated price data for XYZ stock, and an incremented Minor Version Number corresponding to this particular update of XYZ stock. In accordance with the invention, update #2 advantageously does not produce a change in display 1322 because the Minor Version Number included within update#2 is one unit lower than the value of the last previously received Minor Version Number stored in memory 222. After receiving update#2, display 1324 correctly shows the price of XYZ stock as "47.875", such information having been received from update#3 which is the update most recently received by the selective call device 130.

Figure 14:
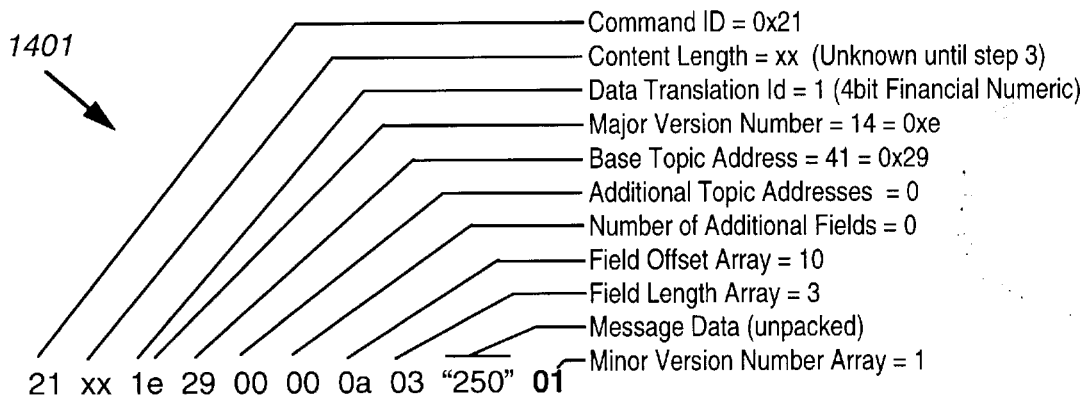
FIG. 14 shows creation of three update commands used to update the sub-messages shown in FIG. 13.
Figure 14:
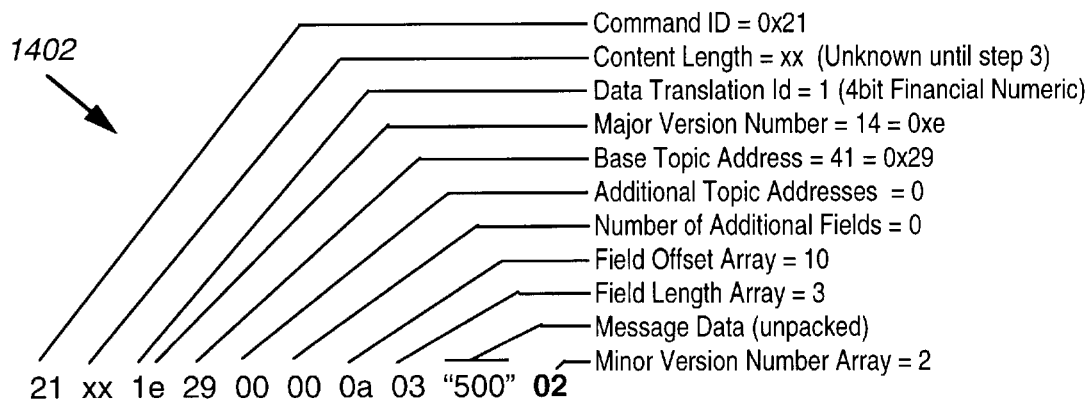
Figure 14:
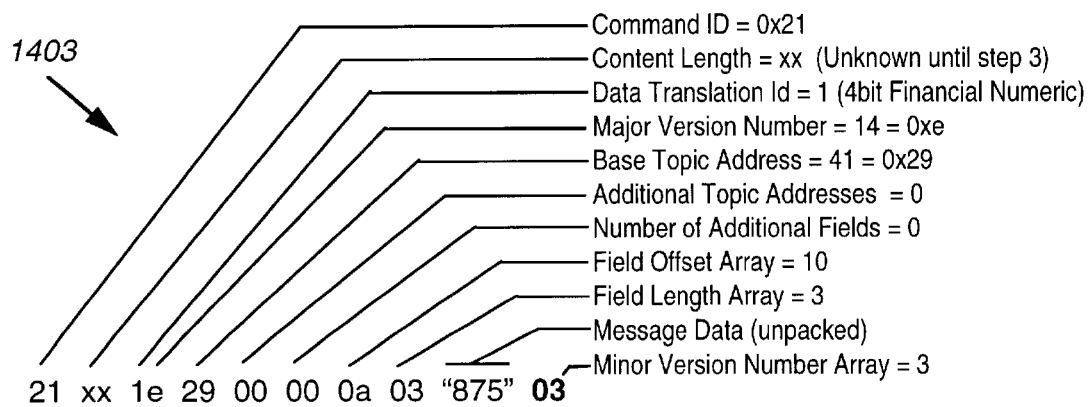

FIG. 14 shows creation of update#1, update#2 and update#3 used to update the sub-messages shown in FIG. 13. Itemized Topic List Update Command 1401, having Major Version Number value of "14" and a Minor Version Number value of "01", is the update#1 of FIG. 13. Itemized Topic List Update Command 1402, having Major Version Number value of "14" and a Minor Version Number value of "02", is the update#2 of FIG. 13. Itemized Topic List Update Command 1403, having Major Version Number value of "14" and a Minor Version Number value of "03", is the update#3 of FIG. 13.

Advantageously, the method in accordance with the invention does not require any change in pre-existing selective call systems or in the pre-existing transport-level paging protocols.

While a detailed description of the preferred embodiments of the invention has been given, it should be appreciated that many variations can be made thereto without departing from the scope of the invention as set forth in the appended claims. For example, the invention is not limited for use with the FLEX transport-level radio paging protocol, but can be used with other paging protocols. Also, the invention is not limited for use with a wireless selective call protocol, but can be used with any wireless protocol. Further, the invention is not limited for use with wireless protocols, but can be used with wireline protocols.

We claim:

1. In a selective call device comprising a processor coupled to a memory element, the selective call device configured to receive a signal transmitted in a standard transport-layer wireless selective call communication protocol format the signal comprising an address portion and a message portion a message portion comprising at least one sub-message, a method of updating sub-messages stored in the memory element comprising the steps of:

(a) receiving a signal comprising a sub-message and a major version number and storing the sub-message and the major version number in the memory element;

(b) subsequent to step (a), receiving an update command within the message portion of said standard transport-layer wireless selective call communication protocol format, the update command comprising a major version number, at least one sub-address and at least one sub-message, each sub-address corresponding to a corresponding sub-message; and (c) determining from the major version number of the update command whether the selective call device is permitted to receive the at least one sub-message within the update command, and updating the memory element in a manner dependent upon the sub-address, the sub-message, and the update command.

2. The method of claim 1 in which the step of determining comprises comparing the major version number received in step (a) with the major version number received in step (b), wherein the memory element is updated only when the major version number received in step (a) equals the major version number received in step (b).

3. In a selective call device comprising a processor coupled to a memory element, the selective call device configured to receive a signal transmitted in a standard transport-layer wireless selective call communication protocol format, the signal comprising an address portion and a message portion, a method of updating a part of a message stored in the memory element comprising the steps of:

(a) receiving a signal comprising a message and a minor version number and storing the message and the minor version number in the memory element;

(b) subsequent to step (a), receiving an update command within the message portion of said standard transport-layer wireless selective call communication protocol format, the update command comprising a minor version number and update data for updating a part of the message;

(c) comparing the minor version number received in step (a) with the minor version number received in step (b), wherein the memory element is updated only when the minor version number received in step (b) is greater than the minor version number received in step (a); and (d) updating a part of the memory element in a manner dependent upon the update data.

4. The method of claim 3, including the step of (e) updating the minor version number stored in the memory element with the minor version number received in step (b).

5. In a selective call device comprising a processor coupled to a memory element, the selective call device configured to receive a signal transmitted in a standard transport-layer wireless selective call communication protocol format, the signal comprising an address portion and a message portion, the message portion comprising at least one sub-message, at least one corresponding sub-address, and a minor version number associated with each of the at least one sub-message, a method of updating sub-messages stored in the memory element, comprising the steps of:

(a) receiving a signal and storing the at least one sub-message and the minor version number associated therewith in the memory element;

(b) subsequent to step (a), receiving another signal comprising an update command, the update command comprising at least one sub-message, at least one corresponding sub-address, and another minor version number associated with each of the at least one sub-message;

(c) comparing the minor version number associated with one of the at least one sub-message having a corresponding sub-address received in step (a) with the another minor version number associated with one of the at least one sub-message having a same corresponding sub-address received in step (b), wherein the memory element is updated only when the another minor version number received in step (b) is greater than the minor version number received in step (a); and (d) in the memory element, updating the at least one sub-message received in step (a) in a manner dependent upon the at least one sub-message received in step (b).

6. In a selective call device comprising a processor coupled to a memory element, the selective call device configured to receive signals transmitted in a standard transport-layer wireless selective call communication protocol format, each signal including an address portion and a message portion, the message portion further including a major version number, a method of updating a part of a message stored in the memory element comprising the steps of:

(a) receiving a signal including, within the message portion of the signal, a message and a first value of the major version number;

(b) storing the message and the first value of the major version number in the memory element;

(c) subsequent to step (b), receiving another signal including, within the message portion of said another signal, an update command and a second value of the major version number, the update command further including update data for updating a part of the message;

(d) determining from the major version number of the update command whether the selective call device is permitted to receive the update data within the update command by comparing the first value of the major version number received in step (a) with the second value of the major version number received in step (c); and (e) if the first value of the major version number received in step (a) equals the second value of the major version number received in step (c), then updating a part of the memory element in a manner dependent upon the update data.

7. In a selective call device comprising a processor coupled to a memory element, the selective call device configured to receive signals transmitted in a standard transport-layer wireless selective call communications protocol format, a method of updating a portion of a message stored in the memory element comprising the steps of:

(a) receiving a first signal comprising a template message and a major version number and storing the template message and the major version number in the memory element;

(b) subsequent to step (a), receiving a second signal comprising message update data and a major version number; and (c) comparing the major version number received in step (a) with the major version number received in step (b), wherein the memory element is updated only when the major version number received in step (a) equals the major version number received in step (b).

8. In a selective call device comprising a processor coupled to a memory element, the selective call device configured to receive signals transmitted in a standard transport-layer wireless selective call communication protocol format, a method of updating sub-messages stored in the memory element comprising the steps of:

(a) receiving a first signal comprising a sub-message template and a major version number and storing the sub-message template and the major version number in the memory element;

(b) subsequent to step (a), receiving a second signal comprising sub-message update data and a major version number; and (c) comparing the major version number received in step(a) with the major version number received in step (b), wherein the memory element is updated only when the major version number received in step (a) equals the major version received in step (b).

9. In a selective call device comprising a processor coupled to a memory element, the selective call device configured to receive signals transmitted in a standard transport-layer wireless selective call communications protocol format, a method of updating a portion of a message stored in the memory element comprising the steps of:

(a) receiving a signal comprising a template message, a major version number and a minor version number and storing in the memory element the template message, the major version number as a stored major version number, and the minor version number as a stored minor version number;

(b) subsequent to step (a), receiving another signal comprising update data for the template message, a major version number and a received minor version number;

(c) comparing the major version number received in step (b) with the stored major version number;

(d) comparing the received minor version number received in step (b) with the stored minor version number;

(e) if the major version number and the stored major version number are equal and if the received minor version number is greater than the stored minor version number, then updating the memory element in accordance with the update data, and changing the value of the stored minor version number in the memory element to the value of the received minor version number.

* * * * *